(12) United States Patent
Shibayama et al.

(10) Patent No.: US 8,027,034 B2
(45) Date of Patent: Sep. 27, 2011

(54) METHOD FOR MANUFACTURING SPECTROSCOPY MODULE, AND SPECTROSCOPY MODULE

(75) Inventors: Katsumi Shibayama, Hamamatsu (JP); Tomofumi Suzuki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 232 days.

(21) Appl. No.: 12/464,267

(22) Filed: May 12, 2009

(65) Prior Publication Data

US 2009/0290154 A1 Nov. 26, 2009

(30) Foreign Application Priority Data

May 15, 2008 (JP) .............................. P2008-128687
Dec. 5, 2008 (JP) .............................. P2008-311012

(51) Int. Cl.
*G01J 3/28* (2006.01)
(52) U.S. Cl. ........................... 356/326; 356/328; 156/60
(58) Field of Classification Search .................. 356/326, 356/328; 29/428, 464; 156/60, 327; 228/175
See application file for complete search history.

(56) References Cited

U.S. PATENT DOCUMENTS

| | | | |
|---|---|---|---|
| 4,644,632 A | 2/1987 | Machler et al. | |
| 5,995,221 A | 11/1999 | Slutter et al. | |
| 6,081,331 A | 6/2000 | Teichmann | |
| 6,303,934 B1 | 10/2001 | Daly et al. | |
| 6,538,736 B1 | 3/2003 | Palumbo | |
| 6,859,274 B2 | 2/2005 | Inamoto | |
| 7,697,137 B2 | 4/2010 | Comstock, II | |
| 7,864,317 B2 | 1/2011 | Bockstaele et al. | |
| 2002/0060792 A1 | 5/2002 | Ibsen et al. | |
| 2003/0197862 A1 | 10/2003 | Cohen et al. | |
| 2006/0268269 A1 | 11/2006 | Warren | |
| 2008/0123095 A1 | 5/2008 | Hubner et al. | |
| 2009/0284741 A1 | 11/2009 | Shibayama et al. | |
| 2009/0284742 A1 | 11/2009 | Shibayama | |
| 2009/0284743 A1 | 11/2009 | Shibayama | |
| 2009/0290155 A1 | 11/2009 | Shibayama et al. | |

(Continued)

FOREIGN PATENT DOCUMENTS

DE 197 17 015 10/1998

(Continued)

OTHER PUBLICATIONS

U.S. Appl. No. 12/992,398, filed Feb. 10, 2011, Shibayama.

(Continued)

*Primary Examiner* — L. G Lauchman
(74) *Attorney, Agent, or Firm* — Drinker Biddle & Reath LLP (57) ABSTRACT

In a spectroscopy module 1, a light detecting element 5 having a light passing hole 50 is used. Therefore, it is possible to prevent the relative positional relationship between the light passing hole 50 and a light detecting portion 5a of the light detecting element 5 from deviating. Moreover, the light detecting element 5 is electrically connected to a wiring 9 formed on a front plane 2a of a substrate 2 by face-down bonding, and a resin layer 79 is formed as an underfill resin between the substrate 2 and the light detecting element 5. Therefore, it is possible to improve the fixing strength between the substrate 2 and the light detecting element 5. Additionally, before the resin layer 79 is formed, a resin layer 78 is formed along a guide portion 77 that surrounds the passing hole 50. Thus, the resin layer 79 is prevented from penetrating into the light passing hole 50, which makes it possible to make a light be appropriately incident into the substrate 2.

5 Claims, 8 Drawing Sheets

U.S. PATENT DOCUMENTS

| | | |
|---|---|---|
| 2009/0290164 A1 | 11/2009 | Shibayama et al. |
| 2011/0075143 A1 | 3/2011 | Shibayama et al. |

FOREIGN PATENT DOCUMENTS

| | | |
|---|---|---|
| FR | 2 847 978 | 6/2004 |
| JP | 4-287001 | 10/1992 |
| JP | 4-294223 | 10/1992 |
| JP | 6-167637 | 6/1994 |
| JP | 08-145794 | 6/1996 |
| JP | 2592081 | 3/1999 |
| JP | 2000-65642 | 3/2000 |
| JP | 2000-298066 | 10/2000 |
| JP | 2003-139611 | 5/2003 |
| JP | 2003-243444 | 8/2003 |
| JP | 2004-191246 | 7/2004 |
| JP | 2004-309146 | 11/2004 |
| JP | 2004-354176 | 12/2004 |
| JP | 2007-199540 | 8/2007 |
| WO | 2008/029852 | 3/2008 |
| WO | 2008/149939 | 12/2008 |
| WO | 2008/149940 | 12/2008 |
| WO | 2008/149944 | 12/2008 |

OTHER PUBLICATIONS

U.S. Appl. No. 12/992,428, filed Feb. 23, 2011, Shibayama.
U.S. Appl. No. 12/992,445, filed Feb. 2, 2011, Shibayama.
U.S. Appl. No. 12/992,412, filed Feb. 28, 2011, Shibayama.
U.S. Appl. No. 12/992,469, filed Feb. 8, 2011, Shibayama.
H.W. Teichmann, et al., "Replizierter Mikro-Optischer Sensor Fur Die Industrielle Spektralsensorik", tm-Technisches Messen, vol. 68, No. 5, May 2001, pp. 200-203 (with partial English-language translation).

METHOD FOR MANUFACTURING SPECTROSCOPY MODULE, AND SPECTROSCOPY MODULE

BACKGROUND OF THE INVENTION

1. Field of the Invention

The present invention relates to a method for manufacturing a spectroscopy module for dispersing light to detect the light and spectroscopy module.

2. Related Background of the Invention

There is known such a conventional spectroscopy module described in, for example, Japanese Published Unexamined Patent Application No. H04-294223 (Patent Document 1), Japanese Published Unexamined Patent Application No. 2004-354176 (Patent Document 2), and Japanese Published Unexamined Patent Application No. 2003-243444 (Patent Document 3). Patent Document 1 has described a spectroscopy module which is provided with a supporting body through which light is allowed to transmit, an incident slit portion through which light is made incident into the supporting body, a concave diffraction grating that disperses the light made incident into the supporting body to reflect the light, and a diode that detects the lights dispersed and reflected by the concave diffraction grating.

SUMMARY OF THE INVENTION

However, in the spectroscopy module described in Patent Document 1, when the incident slit portion and the diode are attached to the supporting body, the relative positional relationship between the incident slit portion and the diode may deviate, thereby degrading the reliability of the spectroscopy module.

The present invention has been achieved in consideration of the above-described circumstances, and an object of the present invention is to provide a method for manufacturing a highly reliable spectroscopy module and spectroscopy module.

In order to achieve the above-described object, a method for manufacturing a spectroscopy module which is provided with a body portion through which light is allowed to transmit, a spectroscopic portion that disperses a light made incident into the body portion from a side of a predetermined plane of the body portion, and reflects lights to the side of the predetermined plane, and a light detecting element which detects the lights dispersed by the spectroscopic portion, the method includes a process of electrically connecting the light detecting element including a light passing hole through which a light advancing to the spectroscopic portion passes, and a guide portion that surrounds the light passing hole and partially leads to an outer edge of the light detecting element, to a wiring formed on the predetermined plane by face-down bonding, a process of forming a first resin layer along the guide portion between the body portion and the light detecting element, and a process of forming a second resin layer so as to make the second resin layer face a light detecting portion of the light detecting element, at an outer side of the first resin layer between the body portion and the light detecting element.

In the method for manufacturing the spectroscopy module, the light detecting element including the light passing hole through which a light advancing to the spectroscopic portion passes is used. Therefore, it is possible to prevent the relative positional relationship between the light passing hole and the light detecting portion of the light detecting element from deviating. Moreover, the light detecting element is electrically connected to the wiring formed on the predetermined plane of the body portion by face-down bonding, and the second resin layer is formed between the body portion and the light detecting element. Therefore, it is possible to improve the fixing strength between the body portion and the light detecting element, which makes it possible to prevent the electrical connection from being cut off due to the face-down bonding. Additionally, before the second resin layer is formed so as to face the light detecting portion of the light detecting element, the first resin layer is formed along the guide portion that surrounds the light passing hole of the light detecting element and partially leads to the outer edge of the light detecting element. Thus, the second resin layer is prevented from penetrating into the light passing hole by the first resin layer. Therefore, a light can be made incident into the body portion without being refracted or diffused due to a shape of the light incident side surface of the second resin layer in the light passing hole. Therefore, according to the method for manufacturing the spectroscopy module, it is possible to improve the reliability.

In the method for manufacturing the spectroscopy module according to the present invention, the second resin layer is composed of a material having an index matching property with respect to the body portion higher than that of the first resin layer. In this case, it is possible to prevent the light between the body portion and the light detecting portion of the light detecting element from being refracted.

In the method for manufacturing the spectroscopy module according to the present invention, the first resin layer is preferably composed of a material having a light absorption property higher than that of the second resin layer. In this case, it is possible to prevent the light advancing to the body portion from the light passing hole from partially becoming leakage light to be made incident into the light detecting portion of the light detecting element.

In the method for manufacturing the spectroscopy module according to the present invention, some portions of the guide portion preferably lead to respective outer edges which the guide portion faces, in the light detecting element. In this case, the first resin layer can be reliably and easily made along the guide portion.

Further, a spectroscopy module according to the present invention is manufactured by the method for manufacturing the spectroscopy module described above. In the spectroscopy module, an attempt is made to improve the reliability from the above-described reasons.

DESCRIPTION OF THE PREFERRED EMBODIMENTS

Hereinafter, preferred embodiments of the present invention will be described in detail with reference to the drawings. In addition, the same or corresponding portions in the respective drawings are denoted by the same reference numerals, and overlapping descriptions thereof will be omitted.

Figure 1:
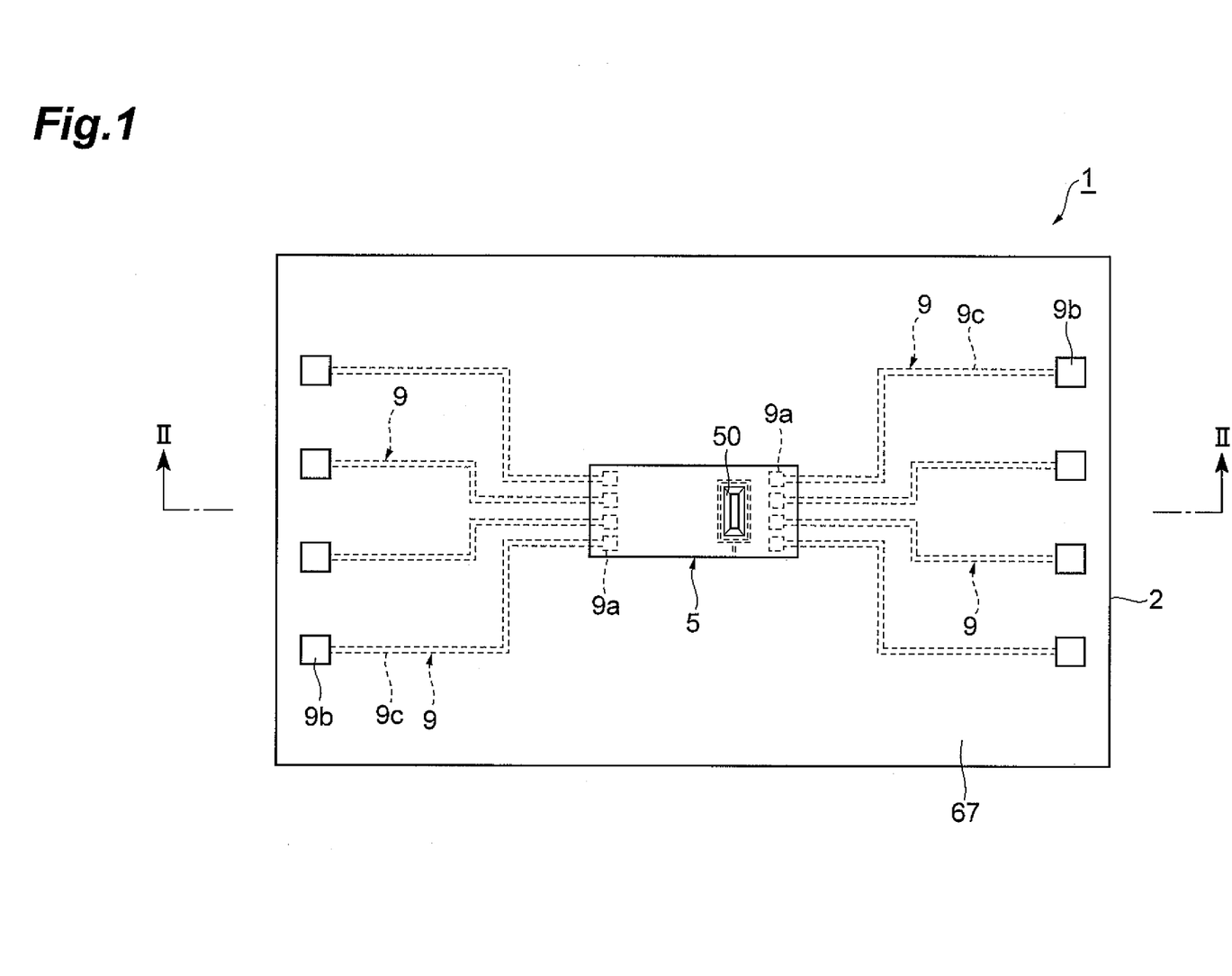
FIG. 1 is a plan view of a spectroscopy module as one embodiment according to the present invention.
Figure 2:
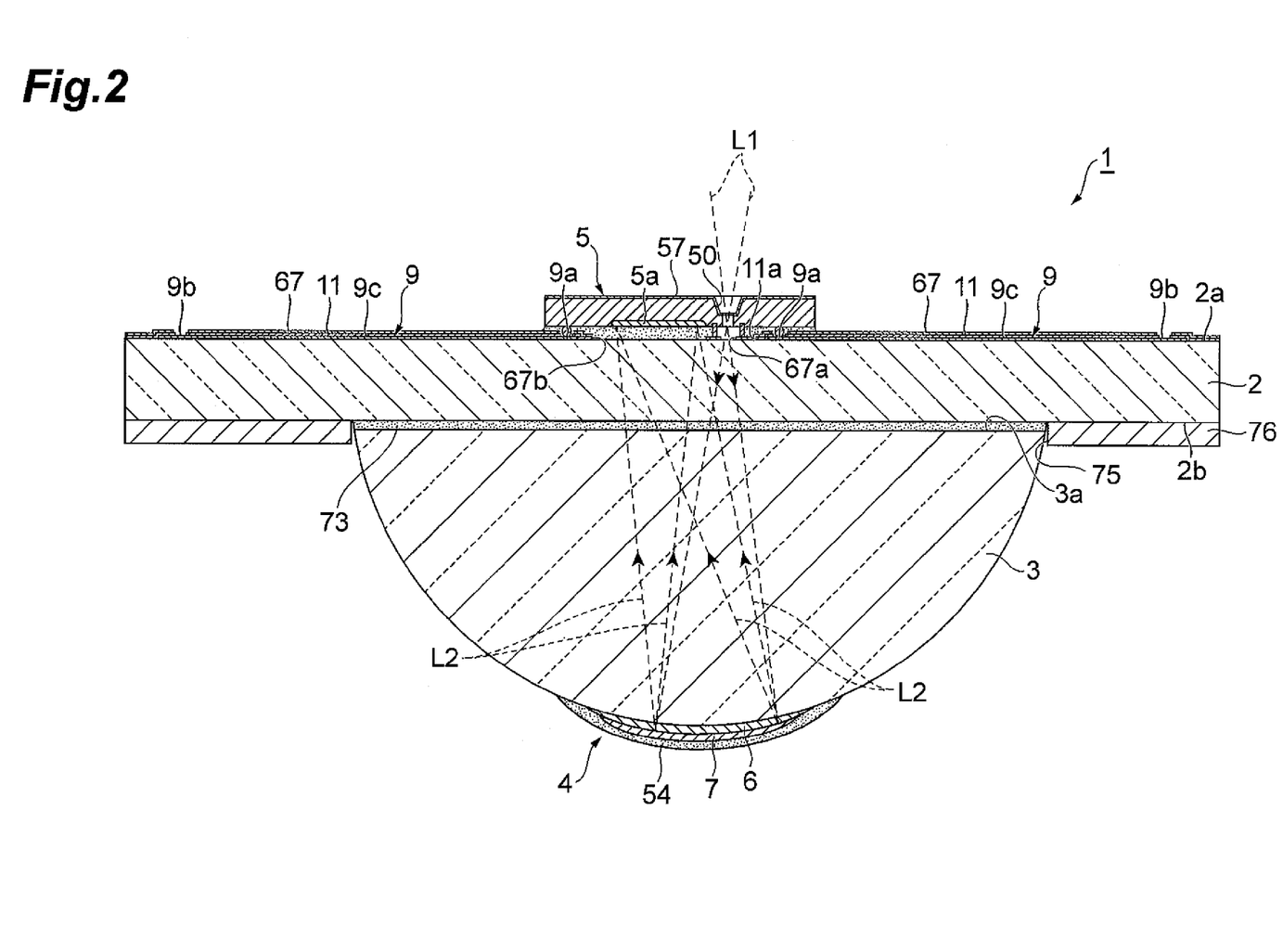
FIG. 2 is a cross sectional view taken along the line II to II shown in FIG. 1.

FIG. 1 is a plan view of a spectroscopy module as one embodiment according to the present invention, and FIG. 2 is a cross sectional view taken along the line II to II shown in FIG. 1. As shown in FIG. 1 and FIG. 2, a spectroscopy module 1 is provided with a substrate (body portion) 2 through which a light L1 made incident from a side of a front plane (predetermined plane) 2a is allowed to transmit, a lens portion (body portion) 3 through which the light L1 made incident into the substrate 2 is allowed to transmit, a spectroscopic portion 4 that disperses the light L1 made incident into the lens portion 3 to reflect the light toward the front plane 2a, and a light detecting element 5 that detects lights L2 dispersed by the spectroscopic portion 4. The spectroscopy module 1 is a micro-spectroscopy module that disperses the light L1 into the lights L2 corresponding to a plurality of wavelengths by the spectroscopic portion 4, and detects the lights L2 by the light detecting element 5, thereby measuring the wavelength distribution of the light L1, the intensity of a specific wavelength component, or the like.

The substrate 2 is formed into a rectangular plate shape (with, for example, an entire length of 15 to 20 mm, a full width of 11 to 12 mm, and a thickness of 1 to 3 mm), from light-transmitting glass such as BK7, Pyrex (registered trademark) and quartz, plastic, or the like. A wiring 9 composed of a single layer film of Al, Au, or the like, or a laminated film of Ti—Pt—Au, Ti—Ni—Au, Cr—Au, or the like is formed on the front plane 2a of the substrate 2. The wiring 9 has a plurality of pad portions 9a disposed in the central area of the substrate 2, a plurality of pad portions 9b disposed at the both ends in the longitudinal direction of the substrate 2, and a plurality of connection portions 9c that connect the pad portions 9a and the pad portions 9b which correspond to one another. In addition, the wiring 9 has a light antireflective layer composed of a single layer film of CrO or the like, or a laminated film of Cr—CrO or the like at the side of the front plane 2a of the substrate 2.

Further, an insulation layer 11 is formed on the front plane 2a of the substrate 2 so as to expose the pad portions 9a and 9b of the wiring 9 and also cover the connection portions 9c of the wiring 9. The insulation layer 11 has an opening portion 11a through which the light L1 advancing to the spectroscopic portion 4 via a light passing hole 50 (which will be described later) of the light detecting element 5 passes, and the lights L2 advancing to a light detecting portion 5a (which will be described later) of the light detecting element 5 pass. Moreover, a light absorption layer 67 is formed on the front plane 2a of the substrate 2 so as to expose the pad portions 9a and 9b of the wiring 9, and also cover the insulation layer 11. The light absorption layer 67 has a light passing hole 67a through which the light L1 advancing to the spectroscopic portion 4 via the light passing hole 50 (which will be described later) of the light detecting element 5 passes, and a light passing hole 67b through which the lights L2 advancing to the light detecting portion 5a (which will be described later) of the light detecting element 5 passes. As a material of the light absorption layer 67, colored resin (silicon, epoxy, acryl, urethane, polyimide, composite resin, or the like) including black resist or a filler (such as carbon or oxide), metal such as Cr or Co or metal oxide thereof, or a laminated film thereof, or porous-type ceramic, metal, or metal oxide, can be cited.

Figure 3:
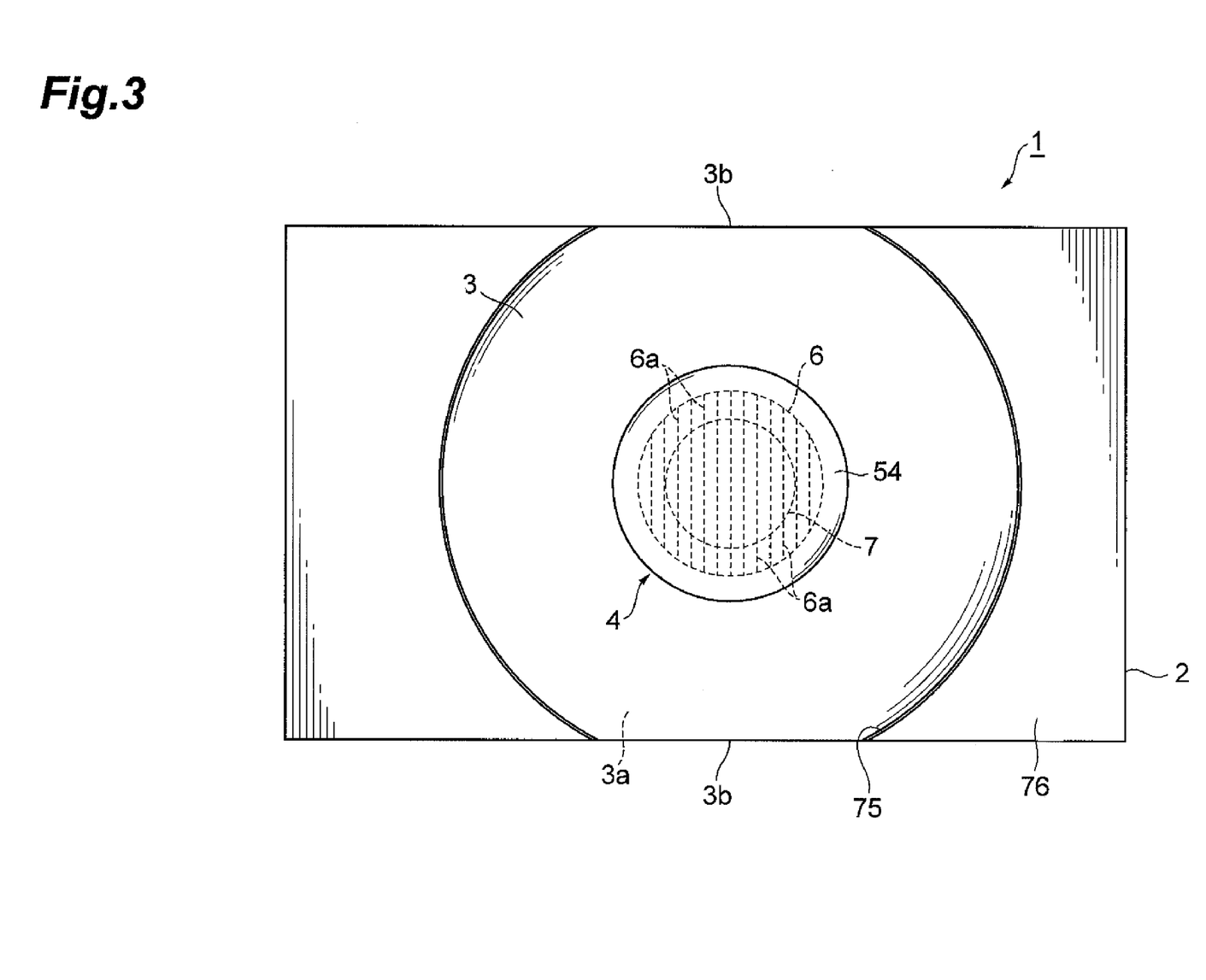
FIG. 3 is a bottom view of the spectroscopy module of FIG. 1.

FIG. 3 is a bottom view of the spectroscopy module of FIG. 1. As shown in FIGS. 2 and 3, a resist layer 76 having an opening portion 75 into which a lens portion 3 is fitted is formed on a rear plane 2b of the substrate 2. The lens portion 3 is formed into a shape such that a semispherical lens is cut off along two planes substantially perpendicular to its bottom plane 3a and substantially parallel to each other to form its side planes 3b (with, for example, a curvature radius of 6 to 10 mm, an entire length of the bottom plane 3a of 12 to 18 mm, a full width of the bottom plane 3a (i.e., a distance between the side planes 3b) of 6 to 10 mm, and a height of 5 to 8 mm), from a material which is the same as that of the substrate 2, that is light-transmitting resin, a light-transmitting organic-inorganic hybrid material, or light-transmitting low-melting point glass or plastic for replica molding, or the like. The lens portion 3 is fitted into the opening portion 75 of the resist layer 76, and is bonded to the rear plane 2b of the substrate 2 with an optical resin adhesive 73 through which the lights L1 and L2 are allowed to transmit. In addition, the lens shape is not limited to a spherical lens, and may be an aspherical lens.

The spectroscopic portion 4 is a reflection type grating having a diffraction layer 6 formed on the outer surface of the lens portion 3, a reflection layer 7 formed on the outer surface of the diffraction layer 6, and a passivation layer 54 that covers the diffraction layer 6 and the reflection layer 7. The diffraction layer 6 is formed so that a plurality of grating grooves 6a are provided adjacent to each other along the longitudinal direction of the substrate 2, and the direction in which the grating grooves 6a are extended is substantially matched to a direction substantially perpendicular to the longitudinal direction of the substrate 2. For example, a cross-sectionally serrated blazed grating, a cross-sectionally rectangular binary grating, a cross-sectionally sinusoidal holographic grating, or the like is applied as the diffraction layer 6, and the diffraction layer 6 is formed by subjecting optical resin for replica molding such as photo curing epoxy resin, acryl resin, or organic-inorganic hybrid resin to photo curing. The reflection layer 7 is a membrane form, and is formed by, for example, evaporating Al, Au, or the like onto the outer surface of the diffraction layer 6. The passivation layer 54 is a membrane form, and is formed by, for example, evaporating $MgF_2$, $SiO_2$, or the like onto the outer surfaces of the diffraction layer 6 and the reflection layer 7. In addition, an optical NA of the spectroscopy module 1 can be adjusted by adjusting an area on which the reflection layer 7 is formed.

In addition, the opening portion 75 of the resist layer 76 is formed by photo-etching so as to have a predetermined positional relationship with respect to the outer edge portion of the substrate 2 serving as a reference portion for positioning the light detecting element 5 to the substrate 2. At this time, because the spectroscopic portion 4 is positioned with respect to the lens portion 3 with high precision, the spectroscopic portion 4 is positioned to the substrate 2 by merely fitting the lens portion 3 into the opening portion 75. Meanwhile, the light detecting element 5 is positioned to the substrate 2 in accordance with the outer edge portion of the substrate 2 serving as a reference portion. Therefore, alignment of the spectroscopic portion 4 and the light detecting element 5 is achieved by merely fitting the lens portion 3 into the opening portion 75.

As shown in FIGS. 1 and 2, the light detecting element 5 is formed into a rectangular plate shape (with, for example, an entire length of 5 to 10 mm, a full width of 1.5 to 3 mm, and a thickness of 0.1 to 0.8 mm). The light detecting portion 5a is formed on the plane at the side of the spectroscopic portion 4 of the light detecting element 5. The light detecting portion 5a is a CCD image sensor, a PD array, or a CMOS image sensor or the like, and is formed so that a plurality of channels are arrayed in a direction substantially perpendicular to the direction in which the grating grooves 6a of the spectroscopic portion 4 are extended (i.e., the direction in which the grating grooves 6a are provided adjacent to each other).

In the case in which the light detecting portion 5a is a CCD image sensor, light intensity information at a position at which the light is made incident into pixels disposed two-dimensionally is subjected to line-binning, and to make the information into light intensity information at a one-dimensional position, the light intensity information at the one-dimensional position is read out in time-series. That is, a line of the pixels subjected to line-binning becomes one channel. In the case in which the light detecting portion 5a is a PD array or a CMOS image sensor, because light intensity information at a position at which the light is made incident into pixels disposed one-dimensionally is read out in time-series, one pixel becomes one channel.

In addition, in the case in which the light detecting portion 5a is a PD array or a CMOS image sensor, and pixels are arrayed two-dimensionally, a line of pixels arrayed in a direction of a one-dimensional array parallel to the direction in which the grating grooves 6a of the spectroscopic portion 4 are extended becomes one channel. Further, in the case in which the light detecting portion 5a is a CCD image sensor, for example, a light detecting portion 5a in which a space between channels in its array direction is 12.5 μm, an entire length of a channel (a length of a one-dimensional pixel row subjected to line-binning) is 1 mm, and the number of channels to be arrayed is 256 is used for the light detecting element 5.

Further, the light passing hole 50 through which the light L1 advancing to the spectroscopic portion 4 passes, that is provided adjacent to the light detecting portion 5a in the array direction of the channels, is formed in the light detecting element 5. The light passing hole 50 is a slit (with, for example, a length of 0.5 to 1 mm and a width of 10 to 100 μm) which is extended in a direction substantially perpendicular to the longitudinal direction of the substrate 2, and is formed by etching or the like so as to be positioned with high precision with respect to the light detecting portion 5a.

Figure 4:
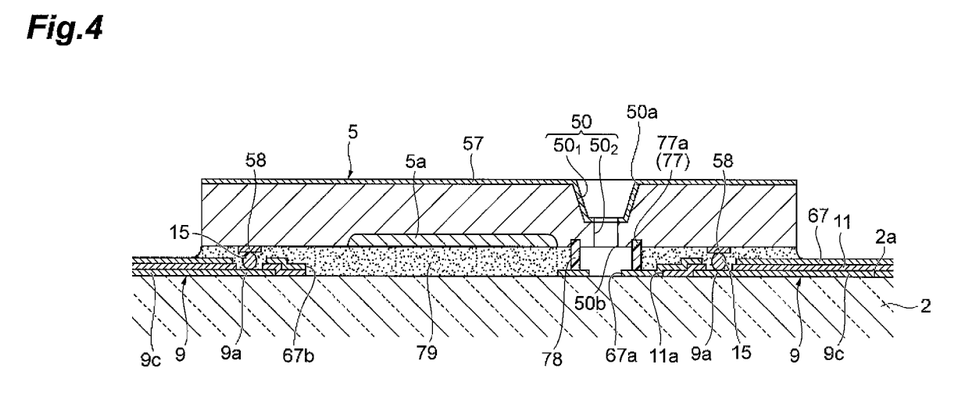
FIG. 4 is an enlarged sectional view of a main part of the spectroscopy module of FIG. 1.

FIG. 4 is an enlarged sectional view of a main part of the spectroscopy module of FIG. 1. As shown in FIG. 4, the light passing hole 50 has a light incident side portion $50_1$ that demarcates a light incident opening 50a through which the light L1 is made incident, and a light emission side portion $50_2$ that demarcates a light emission opening 50b from which the light L1 is emitted. The light emission side portion $50_2$ is formed into a rectangular parallelepiped shape which is extended in a direction substantially perpendicular to the longitudinal direction of the substrate 2, and the light incident side portion $50_1$ is formed into a square pyramid shape broadening toward the opposite side from the light emission side portion $50_2$. A light blocking film 57 is formed on the plane opposite to the spectroscopic portion 4 of the light detecting element 5 and the inner plane of the light incident side portion $50_1$ of the light passing hole 50. The light blocking film 57 blocks the light L1 that is trying to advance to the spectroscopic portion 4 without passing through the light passing hole 50 or the light L1 that is trying to be directly made incident into the light detecting portion 5a.

A plurality of electrodes 58 are provided onto the plane at the side of the spectroscopic portion 4 of the light detecting element 5. The respective electrodes 58 are electrically connected to the corresponding pad portions 9a by face-down bonding via bumps 15 in a state in which the light passing hole 50 faces the light passing hole 67a of the light absorption layer 67 and the light detecting portion 5a faces the light passing hole 67b of the light absorption layer 67. Thereby, electric signals generated in the light detecting portion 5a are derived to the outside via the electrodes 58, the pad portions 9a, the connection portions 9c, and the pad portions 9b.

Figure 5:
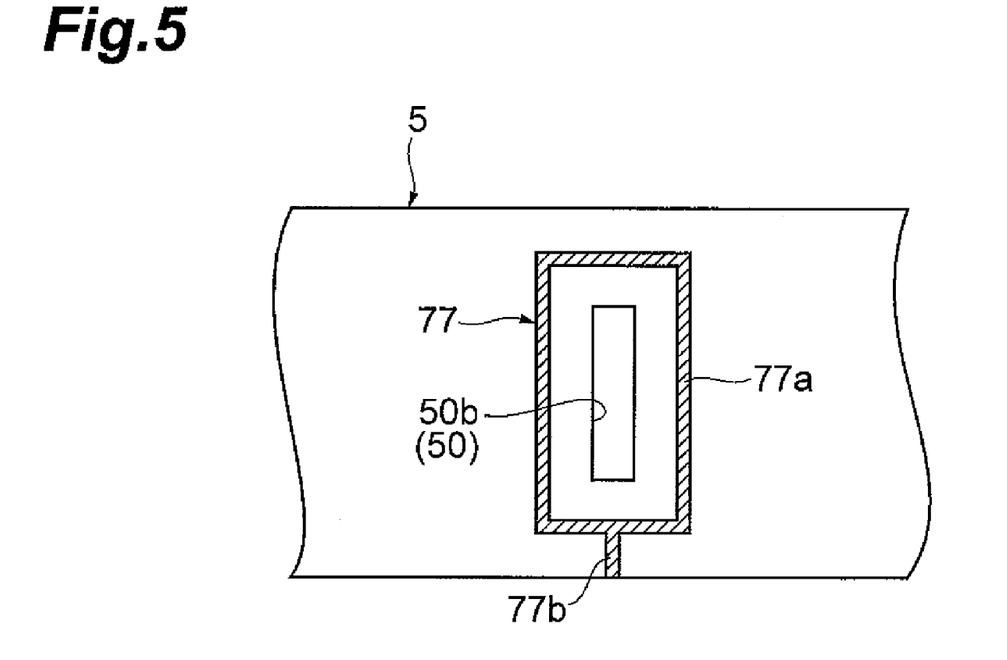
FIG. 5 is an enlarged bottom view of a main part of a light detecting element of the spectroscopy module of FIG. 1.

FIG. 5 is an enlarged bottom view of a main part of a light detecting element of the spectroscopy module of FIG. 1. As shown in FIG. 5, a guide portion 77 is formed as a cross-sectionally rectangular shaped groove by etching or the like in the plane at the side of the substrate 2 of the light detecting element 5. The guide portion 77 has a rectangular annular surrounding portion 77a that surrounds the light emission opening 50b of the light passing hole 50, and an extraction portion 77b leading to the outer edge of the light detecting element 5. In addition, the light emission opening 50b is not limited to a rectangular shape, and may be, for example, a circular shape or an elliptical shape.

As shown in FIG. 4, a resin layer (first resin layer) 78 is formed along the guide portion 77 between the substrate 2 and the light detecting element 5. The resin layer 78 leads to the plane on the light absorption layer 67 from the guide portion 77, and demarcates a space through which the light passing hole 50 and the light passing hole 67a are communicated with each other. Further, a light-transmitting resin layer (second resin layer) 79 is formed at the outer side of the resin layer 78 between the substrate 2 and the light detecting element 5. The resin layer 79 faces the light detecting portion 5a of the light detecting element 5.

In addition, the resin layer 78 is composed of a material having a light absorption property with the substrate 2 higher than that of the resin layer 79. As a material of the resin layer 78, epoxy, acrylic, silicone, urethane, polyimide, or composite resin, or the like can be cited, and a filler (such as carbon or oxide) may be contained in those resins. Further, the resin layer 79 is composed of a material having an index matching property higher than that of the resin layer 78. As a material of the resin layer 79, epoxy, acryl, silicone, oil, or the like can be cited.

In the spectroscope module 1 configured as described above, the light L1 is made incident into the substrate 2 from the side of the front plane 2a of the substrate 2 via the light passing hole 50 of the light detecting element 5 and the light passing hole 67a of the light absorption layer 67, and advances inside the substrate 2, the optical resin adhesive 73, and the lens portion 3, to reach the spectroscopic portion 4. The light L1 reaching the spectroscopic portion 4 is dispersed into lights L2 corresponding to a plurality of wavelengths by the spectroscopic portion 4. The dispersed lights L2, are not only dispersed by the spectroscopic portion 4, but also reflected toward the front plane 2a of the substrate 2, and advance inside the lens portion 3, the optical resin adhesive 73, and the substrate 2 to reach the light detecting portion 5a of the light detecting element 5 via the light passing hole 67b of the light absorption layer 67 and the resin layer 79. The lights L2 reaching the light detecting portion 5a are detected by the light detecting element 5.

A method for manufacturing the spectroscopy module 1 described above will be described.

First, the wiring 9, the insulation layer 11, and the light absorption layer 67 are formed on the front plane 2a of the substrate 2, and the resist layer 76 having the opening portion 75 is formed on the rear plane 2b of the substrate 2. Thereafter, the light detecting element 5 having the light passing hole 50 and the guide portion 77 is prepared, and the electrodes 58 of the light detecting element 5 and the pad portions 9a of the wiring 9 are electrically connected by face-down bonding via the bumps 15.

Next, the resin layer 78 is formed along the guide portion 77 between the substrate 2 and the light detecting element 5. In detail, resin is cast from the extraction portion 77b leading to the outer edge of the light detecting element 5, to make the resin flow around along the surrounding portion 77a surrounding the light emission opening 50b of the light passing hole 50. Then, the resin is subjected to UV-curing or thermal-curing to be cured, to form the resin layer 78.

Next, the resin layer 79 is formed at the outer side of the resin layer 78 between the substrate 2 and the light detecting element 5, so as to face at least the light detecting portion 5a of the light detecting element 5. In detail, a region at the outer side of the resin layer 78 between the substrate 2 and the light detecting element 5 is filled with an optical resin as an underfill, and the resin is cured to form the resin layer 79.

Meanwhile, the spectroscopic portion 4 is formed on the lens portion 3. In detail, a light-transmitting master grating on which gratings corresponding to the diffraction layer 6 are engraved is pushed onto the optical resin for replica molding falling in drops near the tip of the lens portion 3. Then, the optical resin for replica molding is subjected to light in this state to cure the optical resin for replica molding, and the optical resin for replica molding is preferably subjected to thermal curing for stabilization, to form the diffraction layer 6 having the plurality of grating grooves 6a. Thereafter, the master grating is demolded, and Al, Au, or the like is evaporated with a mask or is entirely evaporated onto the outer surface of the diffraction layer 6 to form the reflection layer 7. Moreover, $MgF_2$, $SiO_2$, or the like is evaporated with a mask or is entirely evaporated onto the outer surfaces of the diffraction layer 6 and the reflection layer 7 to form the passivation layer 54.

Next, the optical resin adhesive 73 is applied onto the rear plane 2b of the substrate 2 exposed in the opening portion 75 of the resist layer 76, and the lens portion 3 on which the spectroscopic portion 4 is formed is fitted into the opening portion 75, to be pressed onto the rear plane 2b of the substrate 2. Then, the optical resin adhesive 73 is subjected to light to be cured, to obtain the spectroscopy module 1.

As described above, in the spectroscopy module 1 and the method for manufacturing the spectroscopy module, the light detecting element 5 having the light passing hole 50 through which a light advancing to the spectroscopic portion 4 passes, is used. Therefore, it is possible to prevent the relative positional relationship between the light passing hole 50 and the light detecting portion 5a of the light detecting element 5 from deviating. Moreover, the light detecting element 5 is electrically connected to the wiring 9 formed on the front plane 2a of the substrate 2 by face-down bonding, and the resin layer 79 is formed as an underfill resin between the substrate 2 and the light detecting element 5. Therefore, the fixing strength between the substrate 2 and the light detecting element 5 is improved, which makes it possible to prevent the electrical connection from being cut off due to the face-down bonding. Additionally, before the resin layer 79 is formed so as to face the light detecting portion 5a of the light detecting element 5, the resin layer 78 is formed along the guide portion 77 that surrounds the light passing hole 50 of the light detecting element 5 and partially leads to the outer edge of the light detecting element 5. Thus, the resin layer 79 is prevented from penetrating into the light passing hole 50 by the resin layer 78. Therefore, a light can be made incident into the substrate 2 without being refracted or diffused due to a shape of the light incident side surface of the resin layer 79 in the light passing hole 50. Therefore, according to the spectroscopy module 1 and the method for manufacturing the spectroscopy module 1, it is possible to improve the reliability.

Further, because the resin layer 79 is composed of a material having an index matching property with respect to the substrate 2 higher than that of the resin layer 78, provided that a material of the passivation film (for example, an $SiO_2$ film) at the side of the substrate 2 of the light detecting element 5 or a material having a refraction index approximate to that of a material (for example, BK7) of the substrate 2 is used as a material thereof, it is possible to prevent light from being refracted or reflected between the substrate 2 and the light detecting portion 5a of the light detecting element 5.

Further, because the resin layer 78 is composed of a material having a light absorption property higher than that of the resin layer 79, it is possible to prevent a light advancing to the substrate 2 from the light passing hole 5 from partially becoming leakage light to be made incident into the light detecting portion 5a of the light detecting element 5.

The present invention is not limited to the above-described embodiment.

Figure 6:
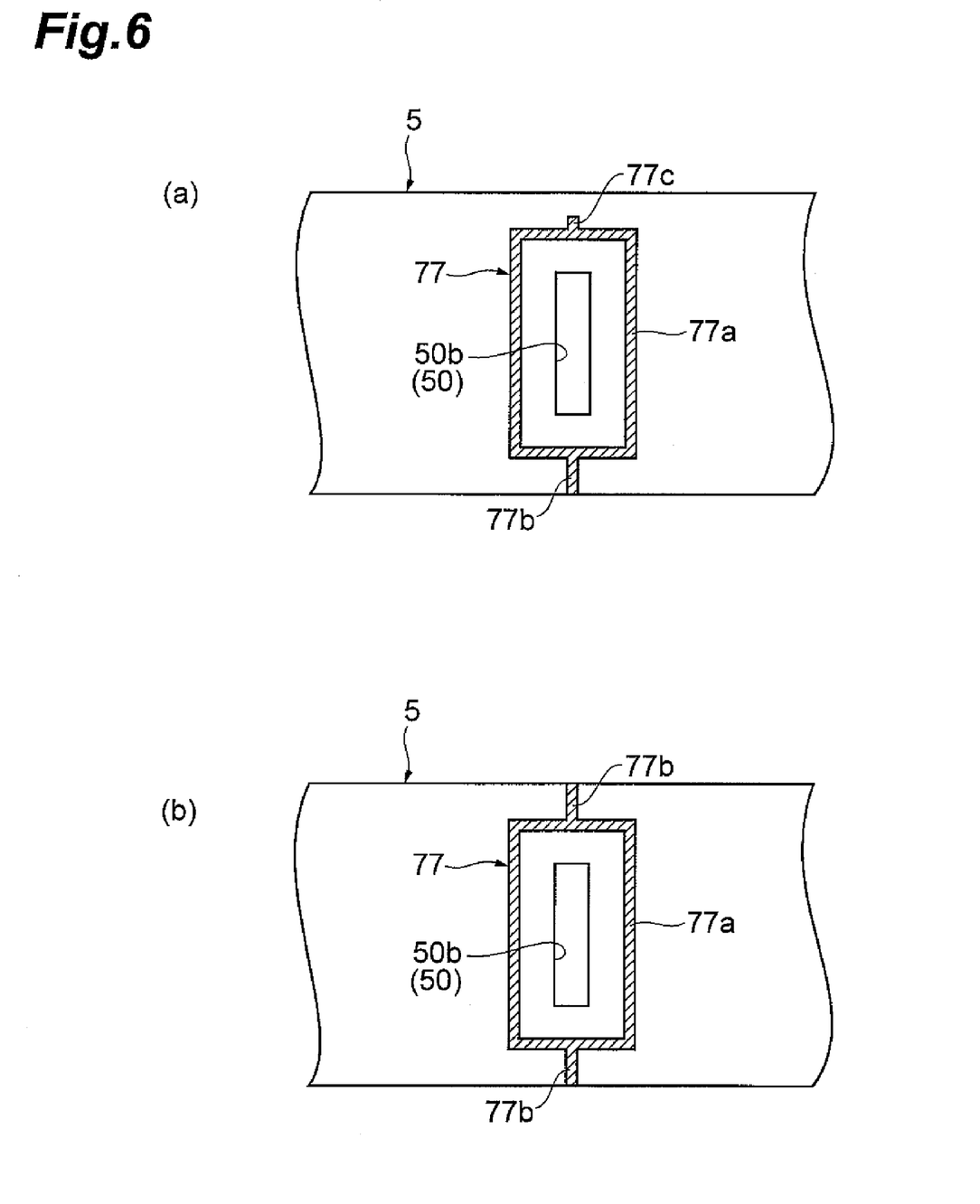
FIG. 6 are enlarged bottom views of main parts of light detecting elements as other embodiments of the spectroscopy module according to the present invention.

For example, various shapes may be applied as the guide portion 77. As shown in FIG. 6A, an extension portion 77c extended to the opposite side of the extraction portion 77b from the surrounding portion 77a may be formed. Further, as shown in FIG. 6B, the respective extraction portions 77b may be made to lead to the outer edges which the extraction portions 77b respectively face in the light detecting element 5. In this case, the resin layer 78 can be reliably and easily made along the guide portion 77.

Figure 7:
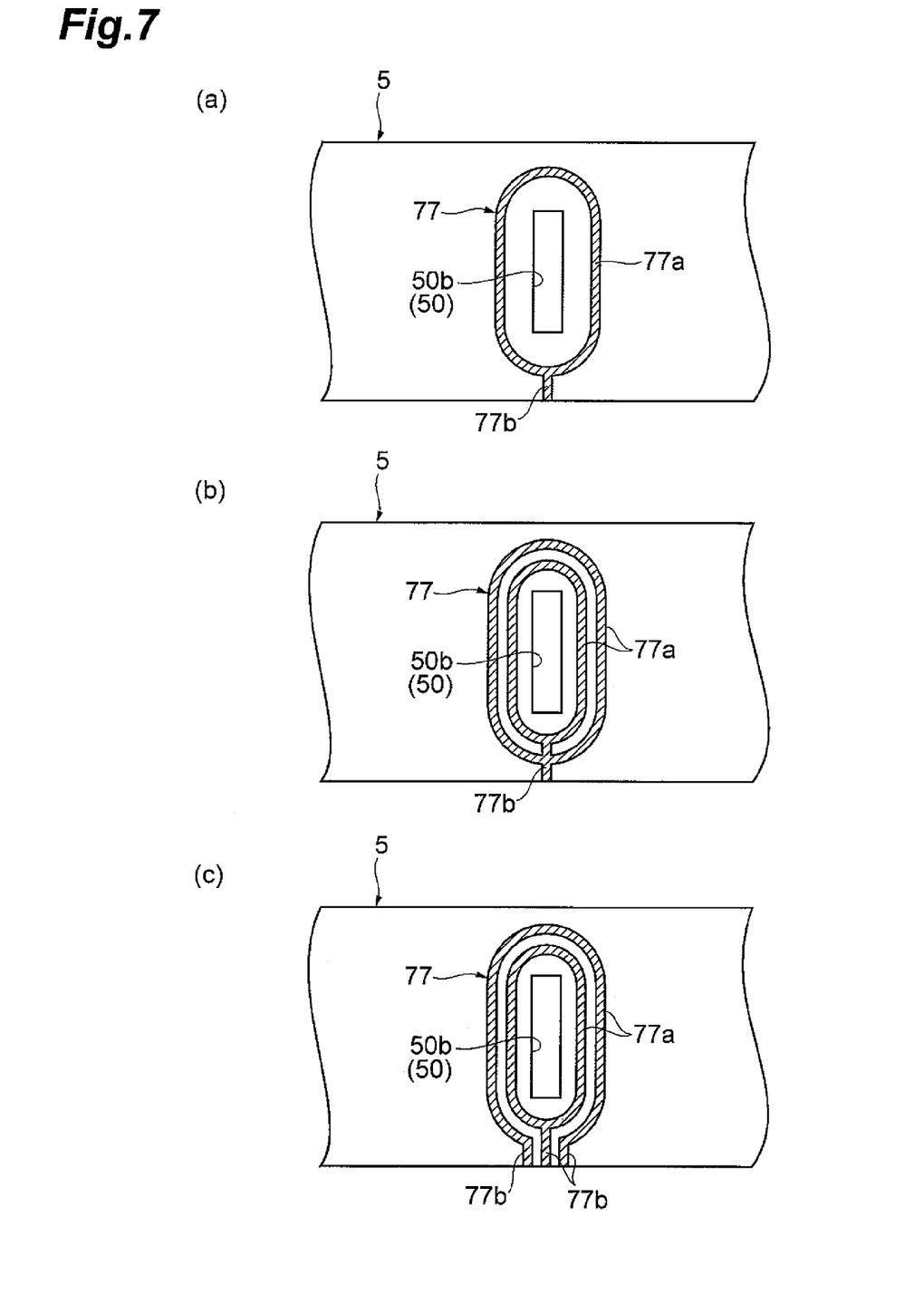
FIG. 7 are enlarged bottom views of light detecting elements as yet other embodiments of the spectroscopy module according to the present invention.

Further, as shown in FIGS. 7A to 7C, the surrounding portion 77a may be formed into an elliptic annular shape. In this case, the resin to become the resin layer 78 can be made to flow more smoothly along the surrounding portion 77a. Further, as shown in FIGS. 7B and 7C, the surrounding portion 77a may be formed double or more. Further, as shown in FIG. 7C, a plurality of extraction portions 77b may be formed so as to lead to a predetermined outer edge of the light detecting element 5.

Figure 8:
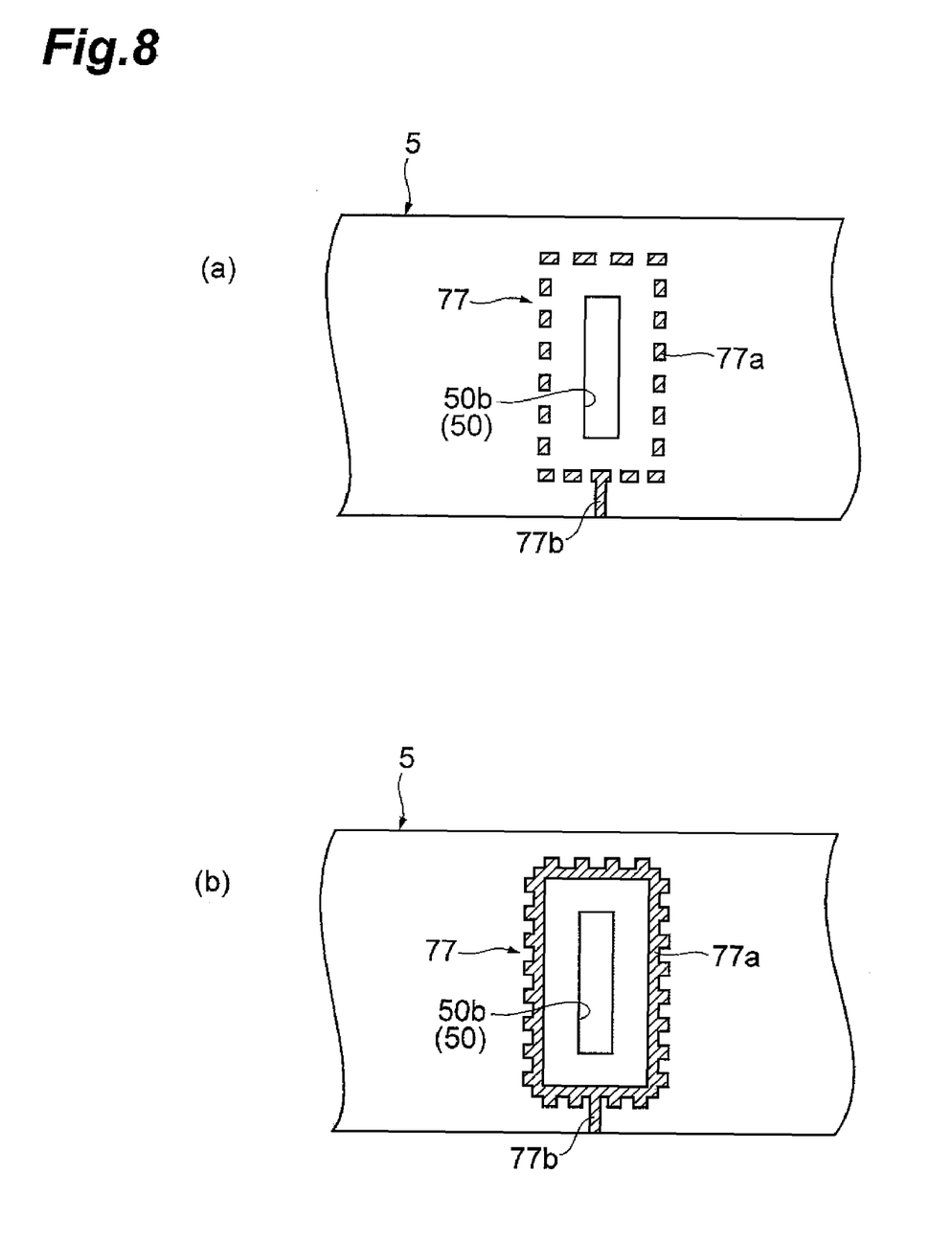
FIG. 8 are enlarged bottom views of main parts of light detecting elements as yet still other embodiments of the spectroscopy module according to the present invention.

Further, as shown in FIG. 8A, the guide portion 77 may be intermittently formed, or as shown in FIG. 8B, the guide portion 77 may be formed into a concavo-convex shape in the direction of the plane at the side of the substrate 2 of the light detecting element 5. In those cases, the resin layer 78 can be made easily adaptable to the guide portion 77.

Further, the guide portion 77 may be formed into a convex shape from a permanent resist or the like. In this case, provided that a material which is the same as that of the resin layer 78 is used, it is possible to improve the wettability between the guide portion 77 and the resin layer 78. In addition, provided that a filler (carbon, oxide, or the like) is contained in at least one of the guide portion 77 and the resin layer 78, it is possible to improve the wettability between the guide portion 77 and the resin layer 78. Moreover, the cross-sectional shapes of the guide portion 77 (the both thereof in the case of a groove and the case of a convex shape) are not limited to a cross-sectionally rectangular shape, but various shapes such as a cross-sectionally U-shape can be adopted.

Further, the substrate 2 and the lens portion 3 may be integrally formed with a mold, and the lens portion 3 and the diffraction layer 6 may be integrally formed of light-transmitting low-melting point glass for replica molding or the like.

In accordance with the present invention, it is possible to improve the reliability of the spectroscopy module.

What is claimed is:

1. A method for manufacturing a spectroscopy module which is provided with a body portion through which light is allowed to transmit, a spectroscopic portion that disperses a light made incident into the body portion from a side of a predetermined plane of the body portion, and reflects lights to the side of the predetermined plane, and a light detecting element which detects the lights dispersed by the spectroscopic portion, the method comprising the steps of:

electrically connecting the light detecting element including a light passing hole through which a light advancing to the spectroscopic portion passes, and a guide portion that surrounds the light passing hole and partially leads to an outer edge of the light detecting element, to a wiring formed on the predetermined plane by face-down bonding;

forming a first resin layer along the guide portion between the body portion and the light detecting element; and     forming a second resin layer so as to make the second resin layer face a light detecting portion of the light detecting element, at an outer side of the first resin layer between the body portion and the light detecting element.

2. The method for manufacturing the spectroscopy module according to claim 1, wherein the second resin layer is composed of a material having an index matching property with respect to the body portion higher than that of the first resin layer.

3. The method for manufacturing the spectroscopy module according to claim 1, wherein the first resin layer is composed of a material having a light absorption property higher than that of the second resin layer.

4. The method for manufacturing the spectroscopy module according to claim 1, wherein some portions of the guide portion lead to respective outer edges which the guide portion faces, in the light detecting element.

5. A spectroscopy module which is manufactured by the method for manufacturing the spectroscopy module according to claim 1.

* * * * *